United States Patent
Azami et al.

(10) Patent No.: US 9,991,561 B2
(45) Date of Patent: Jun. 5, 2018

(54) LITHIUM ION SECONDARY BATTERY

(71) Applicant: NEC Corporation, Tokyo (JP)

(72) Inventors: Takeshi Azami, Tokyo (JP); Hitoshi Ishikawa, Tokyo (JP); Noboru Yoshida, Tokyo (JP); Ikiko Shimanuki, Tokyo (JP); Kazuaki Matsumoto, Tokyo (JP); Makihiro Otohata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days. days.

(21) Appl. No.: 15/021,669

(22) PCT Filed: Aug. 28, 2014

(86) PCT No.: PCT/JP2014/072588
§ 371 (c)(1),
(2) Date: Mar. 11, 2016

(87) PCT Pub. No.: WO2015/037451
PCT Pub. Date: Mar. 19, 2015

(65) Prior Publication Data
US 2016/0226099 A1  Aug. 4, 2016

(30) Foreign Application Priority Data

Sep. 12, 2013 (JP) ................. 2013-189543
Jun. 12, 2014 (JP) ................. 2014-121472

(51) Int. Cl.
| H01M 10/0567 | (2010.01) |
| H01M 10/0525 | (2010.01) |
| H01M 4/133 | (2010.01) |
| H01M 4/587 | (2010.01) |
| H01M 4/36 | (2006.01) |
| H01M 2/16 | (2006.01) |
| H01M 4/131 | (2010.01) |
| H01M 4/505 | (2010.01) |
| H01M 4/62 | (2006.01) |
| H01M 4/66 | (2006.01) |
| H01M 10/0568 | (2010.01) |
| H01M 10/0569 | (2010.01) |
| H01M 4/02 | (2006.01) |

(52) U.S. Cl.
CPC ..... H01M 10/0567 (2013.01); H01M 2/1653 (2013.01); H01M 4/131 (2013.01); H01M 4/133 (2013.01); H01M 4/364 (2013.01); H01M 4/505 (2013.01); H01M 4/587 (2013.01); H01M 4/622 (2013.01); H01M 4/623 (2013.01); H01M 4/625 (2013.01); H01M 4/661 (2013.01); H01M 10/0525 (2013.01); H01M 10/0568 (2013.01); H01M 10/0569 (2013.01); H01M 2004/027 (2013.01); H01M 2004/028 (2013.01); H01M 2300/0037 (2013.01); Y02T 10/7011 (2013.01)

(58) Field of Classification Search
CPC ...... H01M 4/131; H01M 4/133; H01M 4/622; H01M 4/623; H01M 4/625; H01M 4/661; H01M 10/0525; H01M 10/0567; H01M 10/0568; H01M 10/0569
See application file for complete search history.

(56) References Cited

U.S. PATENT DOCUMENTS

| 6,300,013 | B1 * | 10/2001 | Yamada | ................. H01M 4/13 429/212 |
| 7,163,768 | B2 * | 1/2007 | Utsugi | ............. H01M 10/0567 252/62.2 |
| 9,711,825 | B2 * | 7/2017 | Azami | ................. H01M 4/587 |
| 2014/0087249 | A1 | 3/2014 | Azami | |
| 2014/0134461 | A1 * | 5/2014 | Inoue | ..................... H01M 2/26 429/7 |
| 2015/0349332 | A1 * | 12/2015 | Azami | ................. H01M 4/133 429/188 |
| 2016/0020492 | A1 * | 1/2016 | Azami | ................. H01M 4/587 429/327 |

FOREIGN PATENT DOCUMENTS

| CN | 102214826 | * | 10/2011 |
| JP | 9-161778 | | 6/1997 |
| JP | 2002-270159 | | 9/2002 |
| JP | 2003-86244 | | 3/2003 |
| JP | 2003-331915 | | 11/2003 |
| JP | 2004-281325 | | 10/2004 |
| JP | 2004-281368 | | 10/2004 |
| JP | 2004-296115 | | 10/2004 |
| JP | 2005-222846 | | 8/2005 |
| JP | 2005-228631 | | 8/2005 |
| JP | 2005-228635 | | 8/2005 |
| JP | 2008-251403 | | 10/2008 |
| JP | 2009-206000 | | 9/2009 |
| JP | 4899341 | | 3/2012 |
| JP | 2012-94454 | | 5/2012 |
| JP | 2013-051200 | * | 3/2013 |
| JP | 2013-51200 | | 3/2013 |
| WO | WO 2013/005521 | * | 1/2013 |
| WO | WO 2013/008525 A1 | | 1/2013 |
| WO | WO 2014/109406 | * | 7/2014 |

OTHER PUBLICATIONS

International Search Report and Written Opinion dated Oct. 21, 2014 in corresponding PCT International Application.

* cited by examiner

Primary Examiner — Anca Eoff
(74) Attorney, Agent, or Firm — Finnegan, Henderson, Farabow, Garrett & Dunner, L.L.P.

(57) ABSTRACT

The present invention provides a lithium ion secondary battery comprising: a positive electrode; a negative electrode comprising a negative electrode active material comprising at least one carbon material selected from the group consisting of a natural graphite, an artificial graphite, a non-graphitizable carbon and a graphitizable carbon; and an electrolyte solution comprising a specific cyclic disulfonate ester compound and an acid anhydride.

14 Claims, 1 Drawing Sheet

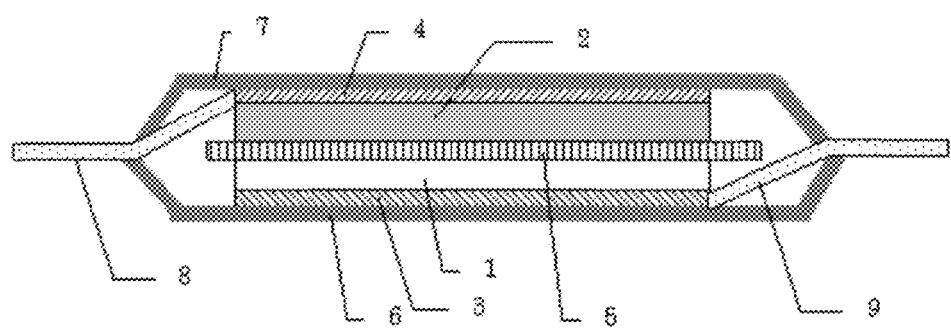

LITHIUM ION SECONDARY BATTERY

CROSS-REFERENCE TO RELATED PATENT APPLICATIONS

This application is a National Stage Entry of International Application No. PCT/JP2014/072588, filed Aug. 28, 2014, which claims priority from Japanese Patent Application No. 2013-189543, filed Sep. 12, 2013 and Japanese Patent Application No. 2014-121472, filed Jun. 12, 2014. The entire contents of the above-referenced applications are expressly incorporated herein by reference.

TECHNICAL FIELD

The present invention relates to a lithium ion secondary battery.

Along with the rapid market expansion in mobile tablet terminals, smart phones, electric cars, stationary power storage systems and the like, safe, long-life, and high-energy density secondary batteries are demanded.

Lithium ion secondary batteries are broadly put to practical use as batteries for small-size electronic devices such as laptop computers and cell phones due to advantages including a high energy density, a low self-discharge, and an excellent long-term reliability. Such lithium ion secondary batteries contain a lithium manganese composite oxide-based positive electrode, a carbon-based negative electrode, and a nonaqueous electrolyte solution; and particularly the electrolyte solution affects the deterioration of the battery characteristics.

In the charge and discharge of lithium ion secondary batteries, the deintercalation and intercalation reactions of lithium ions are caused at the interface between the electrode and the electrolyte solution. At this time, other than the reactions at the interface, a solvent and a supporting salt in the electrolyte solution cause decomposition reactions in some cases. The decomposition reactions form a high-resistance film on the electrode surface, and inhibits the deintercalation and intercalation reactions of lithium ions, which might intrinsically be caused. It is known that consequently, irreversible decrease in the discharge capacity, and the like are promoted and the characteristics as secondary batteries deteriorate.

In order to suppress the deterioration of characteristics of secondary batteries, various devices have been made. There is one method as one of the devices in which the decomposition reaction is suppressed by formation of a protection film on the electrode surface. For example, use of an electrolyte solution containing an additive such as a cyclic disulfonate ester and having a film-forming ability has been proposed.

Patent Literature 1, Patent Literature 2, Patent Literature 3 and Patent Literature 4 describe electrolyte solutions for secondary batteries containing an aprotic solvent and a cyclic sulfonate ester having at least two sulfonyl groups.

Patent Literature 5 describes a lithium ion secondary battery having an electrolyte solution containing a chain disulfonate ester and a cyclic monosulfonate ester or a cyclic disulfonate ester, and a negative electrode containing an amorphous carbon as its negative electrode active material.

Meanwhile, Patent Literature 6 describes a nonaqueous electrolyte secondary battery using an electrolyte solution containing at least one compound selected from cyclic carbonate esters having an unsaturated bond and acid anhydrides, a sulfur-containing organic compound, and at least one compound selected from fluorine-containing aromatic compounds, aliphatic hydrocarbon compounds and fluorine-containing aliphatic hydrocarbon compounds having 9 or less carbon atoms.

CITATION LIST

Patent Literature

Patent Literature 1: JP2004-281368A
Patent Literature 2: JP2005-222846A
Patent Literature 3: JP2004-281325A
Patent Literature 4: JP2005-228631A
Patent Literature 5: JP4899341B
Patent Literature 6: JP2003-331915A

SUMMARY OF INVENTION

Technical Problem

However, there has been increasingly raised the demand towards high performance for recent year's lithium ion secondary batteries, and improvements in various battery characteristics have been demanded.

An object of the present invention is to provide a lithium ion secondary battery improved in the battery characteristics, particularly a low-temperature rate capability.

Solution to Problem

A lithium ion secondary battery according to an exemplary embodiment comprises: a positive electrode; a negative electrode comprising a negative electrode active material comprising at least one carbon material selected from the group consisting of a natural graphite, an artificial graphite, a non-graphitizable carbon and a graphitizable carbon; and an electrolyte solution comprising a cyclic disulfonate ester compound represented by the following formula (1) and an acid anhydride.

[Formula 1]

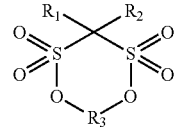

(1)

wherein $R_1$ and $R_2$ are each independently an atom or a substituent selected from the group consisting of a hydrogen atom, an alkyl group having 1 to 5 carbon atoms, a halogen atom and an amino group; and $R_3$ represents a linkage group selected from the group consisting of an alkylene group having 1 to 5 carbon atoms, a carbonyl group, a sulfinyl group, a sulfonyl group, a fluoroalkylene group having 1 to 6 carbon atoms and a divalent group including alkylene groups or fluoroalkylene groups bonded through an ether bond and having 2 to 6 carbon atoms.

Advantageous Effects of Invention

According to the exemplary embodiment, a lithium ion secondary battery improved in the low-temperature rate capability can be provided.

BRIEF DESCRIPTION OF DRAWING

FIG. 1 is a schematic constitution view illustrating one example of the basic constitution of a lithium ion secondary battery according to the exemplary embodiment.

DESCRIPTION OF EMBODIMENTS

A lithium ion secondary battery according to an exemplary embodiment comprises: an electrolyte solution comprising a specific cyclic disulfonate ester compound and an acid anhydride; and a specific carbon-based negative electrode. In such a secondary battery, a low-resistance good-quality film is formed on the negative electrode, and the rate capability at low temperatures (low-temperature rate capability) can be improved.

Preferably by using a mixed material in combination of two or more carbon materials as a carbon-based negative electrode active material, more preferably by using a mixed material in combination of a graphite-based carbon material (a natural graphite or/and an artificial graphite) and a non-graphitizable carbon, in cooperation with the effect of the specific cyclic disulfonate ester compound and the acid anhydride added to the electrolyte solution, the low-temperature rate capability can further be improved.

Further by using the cyclic disulfonate ester compound having a specific structure, the storage characteristic (low-temperature rate capability after a storage test) can be improved.

Hereinafter, the exemplary embodiment will be described.

A basic constitution of a lithium ion secondary battery according to the exemplary embodiment will be described by reference to the drawing. FIG. 1 is a schematic constitution view illustrating one example of the basic constitution of the secondary battery according to the exemplary embodiment. In a positive electrode, a positive electrode active material layer 1 is formed as a film on a positive electrode current collector 3. In a negative electrode, a negative electrode active material layer 2 is formed as a film on a negative electrode current collector 4. These positive electrode and negative electrode are arranged to oppose each other through a porous separator 5. The porous separator 5 is laminated on and arranged approximately parallel to the positive electrode active material layer 1 and the negative electrode active material layer 2. The pair of electrodes of the positive electrode and the negative electrode, and an electrolyte solution are enclosed in casings 6 and 7. A positive electrode tab 9 connected to the positive electrode and a negative electrode tab 8 connected to the negative electrode are installed so as to expose from the casings. The shape of the secondary battery according to the exemplary embodiment is not especially limited, and examples thereof include a laminate-cased type, a cylindrical type, a square type, a coin type and a button type.

(An Electrolyte Solution, and Additives)

An electrolyte solution (nonaqueous electrolyte solution) of a lithium ion secondary battery according to the exemplary embodiment comprises, as additives, an acid anhydride and a cyclic disulfonate ester compound represented by the following formula (1).

[Formula 2]

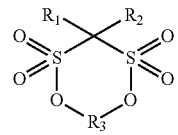

(1)

wherein $R_1$ and $R_2$ are each independently an atom or a substituent selected from the group consisting of a hydrogen atom, an alkyl group having 1 to 5 carbon atoms, a halogen atom and an amino group; and $R_3$ represents a linkage group selected from the group consisting of an alkylene group having 1 to 5 carbon atoms, a carbonyl group, a sulfinyl group, a sulfonyl group, a fluoroalkylene group having 1 to 6 carbon atoms and a divalent group including alkylene groups or fluoroalkylene groups bonded through an ether bond and having 2 to 6 carbon atoms.

The compound represented by the formula (1) decomposes due to the electrochemical redox reaction in the charge and discharge reaction to form a film on the negative electrode active material surface, and can thereby suppress the decomposition of the electrolyte solution and a supporting salt. Thereby, the life of the lithium ion secondary battery can be elongated and the storage characteristics such as capacity maintenance can be improved. Further in cooperation with the addition effect of the acid anhydride, the good-quality thin film can be formed and the low-temperature rate capability of the lithium ion secondary battery can be improved.

In the formula (1), either $R_1$ or $R_2$ is preferably substituted with an atom other than a hydrogen atom or a substituent. That is, at least one of $R_1$ and $R_2$ in the formula (1) is preferably an atom or a substituent selected from the group consisting of an alkyl group having 1 to 5 carbon atoms, a halogen atom, and an amino group. Examples of the halogen atom include a fluorine atom, a chlorine atom and a bromine atom. In the case of using such a compound, the film-forming ability on the negative electrode surface can be improved as compared with the case of using the compound in which $R_1$ and $R_2$ are both hydrogen atoms. Further in the case of using such a compound, the low-temperature rate capability of the battery after a storage test can be improved as compared with the case of using the compound in which $R_1$ and $R_2$ are both hydrogen atoms.

The reason is presumably that when at least one of $R_1$ and $R_2$ is not a hydrogen atom in the formula (1), the reactivity of decomposition products of a supporting salt with the cyclic disulfonate ester compound decreases and the generation of a free acid from the electrolyte solution can be suppressed. In the case where such a compound is added to the electrolyte solution, as compared with the case of adding the compound in which $R_1$ and $R_2$ are both hydrogen atoms, the stability of the electrolyte solution is improved and the low-temperature rate capability of the battery after the storage test can also be improved.

In the formula (1), at least one of $R_1$ and $R_2$ is preferably an alkyl group having 1 to 5 carbon atoms. Both of $R_1$ and $R_2$ may each independently be an alkyl group having 1 to 5 carbon atoms, but more preferably, one of $R_1$ and $R_2$ is an alkyl group having 1 to 5 carbon atoms, and the other is a hydrogen atom.

Examples of the alkyl group of $R_1$ and $R_2$ in the formula (1) include a methyl group, an ethyl group, a propyl group, a butyl group and a pentyl group, and these may be straight-chain ones or branched-chain ones. A methyl group, an ethyl group and a propyl group are especially preferable.

$R_3$ in the formula (1) is preferably an alkylene group having 1 to 5 carbon atoms or a fluoroalkylene group having 1 to 6 carbon atoms, more preferably an alkylene group having 1 to 3 carbon atoms or a fluoroalkylene group having 1 to 3 carbon atoms, and still more preferably an alkylene group having 1 or 2 carbon atoms or a fluoroalkylene group having 1 or 2 carbon atoms. These alkylene groups and fluoroalkylene groups may be straight-chain ones or branched-chain ones. These alkylene groups and fluoroalkylene groups are preferably a methylene group, an ethylene group, a monofluoromethylene group, a difluoromethylene group, a monofluoroethylene group, a difluoroethylene group, a trifluoroethylene group and a tetrafluoroethylene group. Among these, a methylene group and an ethylene group are more preferable, and a methylene group is most preferable.

Examples of preferable compounds represented by the formula (1) include a compound in which $R_1$ and $R_2$ are hydrogen atoms, and $R_3$ is a methylene group or an ethylene group (preferably a methylene group), and a compound in which one of $R_1$ and $R_2$ is a hydrogen atom, and the other is an alkyl group having 1 to 5 carbon atoms (preferably an alkyl group having 1 to 3 carbon atoms), and $R_3$ is a methylene group or an ethylene group (preferably a methylene group); and a more preferable compound is a compound in which one of $R_1$ and $R_2$ is a hydrogen atom, and the other is a methyl group, and $R_3$ is a methylene group or an ethylene group (preferably a methylene group).

The compounds represented by the formula (1) may be used singly or in combinations of two or more.

In Table 1, specific examples of the compounds represented by the formula (1) are indicated, but the cyclic disulfonate ester compounds to be used in the exemplary embodiment are not limited thereto.

TABLE 1

| Compound No. | Chemical Structure |
|---|---|
| 1 | |
| 2 | |
| 3 | |
| 4 | |
| 5 | |
| 6 | |
| 7 | |
| 8 | |
| 9 | |
| 10 | |
| 11 | |
| 12 | |
| 13 | |

TABLE 1-continued

| Compound No. | Chemical Structure |
|---|---|
| 14 | 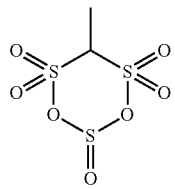 |
| 15 | 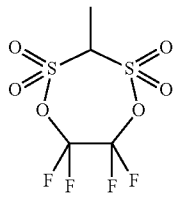 [SMILES: CC1S(=O)(=O)OC(F)(F)C(F)(F)OS1(=O)=O] |
| 16 | 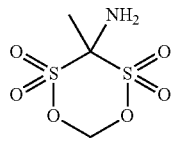 |
| 17 | 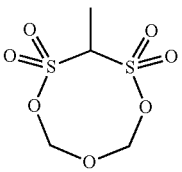 |
| 18 | 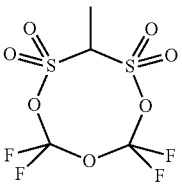 |
| 19 | 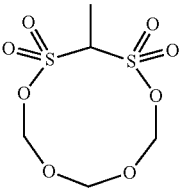 |
| 20 | 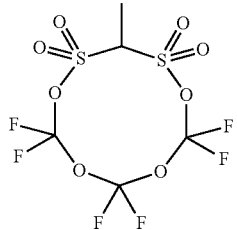 [SMILES: CC1S(=O)(=O)OC(F)(F)OC(F)(F)OC(F)(F)OS1(=O)=O] |

TABLE 1-continued

| Compound No. | Chemical Structure |
|---|---|
| 21 | 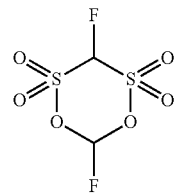 [SMILES: O=S1(=O)OC(F)OS(=O)(=O)C1F] |

The compounds represented by the formula (1) can be produced by using production methods described in U.S. Pat. No. 4,950,768 (JP61-501089A, JP05-44946B), JP2005-336155A and the like.

The content A of the compound represented by the formula (1) in the electrolyte solution is not especially limited, and the mass percent concentration thereof in the electrolyte solution can be set in the range of 0.005 to 10% by mass. The content, from the viewpoint of providing a sufficient addition effect, can be set at 0.005% by mass or higher, and is preferably 0.01% by mass or higher, and more preferably 0.1% by mass or higher. Further the content, from the viewpoint of suppressing an increase in the viscosity of the electrolyte solution and an increase in the resistance accompanying it, can be set at 10% by mass or lower, and is preferably 5% by mass or lower. Further the molar concentration of the compound represented by the formula (1) in the electrolyte solution can be set in the range of 0.01 mol/L to 1 mol/L, and is preferably in the range of 0.01 mol/L to 0.5 mol/L.

Examples of the acid anhydride to be added to the electrolyte solution include carboxylic anhydrides such as maleic anhydride, acetic anhydride, propionic anhydride, succinic anhydride, phthalic anhydride, glutaric anhydride, fluorinated succinic anhydride represented by the formula (a) and fluorinated glutaric anhydride represented by the formula (b). Among these, maleic anhydride, succinic anhydride, the fluorinated succinic anhydride represented by the formula (a) and the fluorinated glutaric anhydride represented by the formula (b) are preferable; and the fluorinated succinic anhydride represented by the formula (a) and the fluorinated glutaric anhydride represented by the formula (b) are more preferable. These acid anhydrides may be used singly or in combinations of two or more.

[Formula 3]

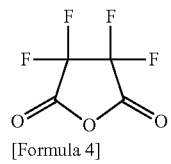

(a)

[Formula 4]

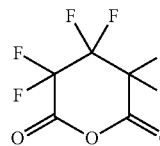

(b)

The content B of the acid anhydride in the electrolyte solution is not especially limited, and the mass percent concentration thereof in the electrolyte solution can be set in the range of 0.005 to 10% by mass. The content, from the viewpoint of providing a sufficient addition effect, can be set at 0.005% by mass or higher, and is preferably 0.01% by mass or higher, more preferably 0.05% by mass or higher, and still more preferably 0.1% by mass or higher. Further the content, from the viewpoint of suppressing an increase in the viscosity of the electrolyte solution and an increase in the resistance accompanying it, and a decrease in the storage capacity, and the like, can be set at 10% by mass or lower, and is preferably 5% by mass or lower. Further the molar concentration of the acid anhydride in the electrolyte solution can be set in the range of 0.01 mol/L to 1 mol/L, and is preferably in the range of 0.01 mol/L to 0.5 mol/L.

The molar ratio B/A of the content B of the acid anhydride in the electrolyte solution to the content A of the compound represented by the formula (1) in the electrolyte solution is preferably in the range of 1/9 to 9/1, preferably in the range of 4/6 to 8/2, and preferably in the range of 5/5 to 7/3. Further the content C of the total of the content A and the content B is preferably in the range of 1.5 mol/L or lower, and preferably in the range of 1.0 mol/L or lower.

By setting the content A of the compound represented by the formula (1) and the content B of the acid anhydride in such ranges, the improvement effect of the low-temperature rate capability of a secondary battery can be enhanced while an increase in the resistance and a decrease in the capacity are suppressed.

Further, as required, other additives other than the above compound and acid anhydride can also be contained in the electrolyte solution. Examples of the other additives include overcharge-preventing agents, surfactants and the following compounds having at least one sulfonyl group.

The electrolyte solution of a secondary battery according to the exemplary embodiment can contain a compound (hereinafter, referred to also as "sulfonyl group-containing compound") having at least one sulfonyl group. This sulfonyl group-containing compound is a compound different from the cyclic disulfonate ester compound represented by the formula (1). Further the sulfonyl group-containing compound may be a compound duplicate with a nonaqueous solvent later described, or may be contained as a nonaqueous solvent. The sulfonyl group-containing compound is preferably used with at least one nonaqueous solvent selected from the group consisting of cyclic carbonates, chain carbonates, aliphatic carboxylate esters, γ-lactones, cyclic ethers, chain ethers and fluorine derivatives thereof.

The sulfonyl group-containing compound is preferably a sultone compound represented by the following formula (2) or (3).

[Formula 5]

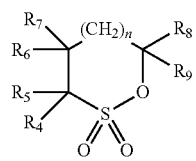

(2)

[Formula 6]

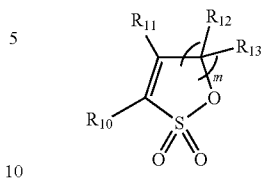

(3)

In the formula (2), n represents an integer of 0 to 2; and $R_4$ to $R_9$ each independently represent a hydrogen atom, an alkyl group having 1 to 12 carbon atoms, a cycloalkyl group having 3 to 6 carbon atoms, or an aryl group having 6 to 12 carbon atoms.

In the formula (3), m represents an integer of 0 to 3; and $R_{10}$ to $R_{13}$ represent each a hydrogen atom, a fluorine atom, or an alkyl group which has 1 to 12 carbon atoms and may contain a fluorine atom, a cycloalkyl group having 3 to 6 carbon atoms, or an aryl group having 6 to 12 carbon atoms.

Examples of the sultone compound represented by the formula (2) include saturated cyclic sulfonate esters such as 1,3-propanesultone (PS) and 1,4-butanesultone. Examples of the compound represented by the formula (3) include unsaturated cyclic sulfonate esters such as 1,3-prop-2-enesultone. These can be used singly or in combinations of two or more. By adding the sultone compound represented by the formula (2) or (3), the regulation of the viscosity of the electrolyte solution is made easy. Due to the synergetic effect caused by combined use of the compound having a sulfonyl group, the stability of the film on the negative electrode surface can also be improved. Further, the decomposition of solvent molecules can be suppressed and the removal effect of moisture in the electrolyte solution can be made large.

The content of the sulfonyl group-containing compound in the electrolyte solution can be set in the range of 0.005 to 10% by mass, and can preferably be set in the range of 0.1 to 5% by mass.

The electrolyte solution of a secondary battery according to the exemplary embodiment can further contain a vinylene carbonate or its derivative. Examples of the vinylene carbonate or its derivative include vinylene carbonates such as vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate and 4,5-diphenylvinylene carbonate; and vinylalkylene carbonates such as vinylethylene carbonate (VEC) and divinylethylene carbonate.

As the electrolyte solution containing the above additives, although not especially limited, for example, a solution in which a lithium salt is dissolved as a supporting salt in a nonaqueous solvent can be used.

Examples of the lithium salt include $LiPF_6$, lithiumimide salt, $LiAsF_6$, $LiAlCl_4$, $LiClO_4$, $LiBF_4$ and $LiSbF_6$. Examples of the lithiumimide salt include $LiN(C_kF_{2k+1}SO_2)(C_mF_{2m+1}SO_2)$ (k and m are each independently 1 or 2). The lithium salts may be used singly or in combinations of two or more.

The concentration of the lithium salt in the nonaqueous electrolyte solution can be set in the range of 0.5 to 2.0 mol/L, and is preferably in the range of 0.7 to 1.8 mol/L. When the concentration of the lithium salt is made to be 0.5 mol/L or higher, a sufficient ionic conductivity can be obtained. Further when the concentration of the lithium salt is made to be 2.0 mol/L or lower, an increase in the viscosity can be suppressed and the migration of lithium ions is not prevented.

The nonaqueous solvent is not especially limited, and at least one solvent selected from the group consisting of cyclic carbonates, chain carbonates, aliphatic carboxylate esters, γ-lactones, cyclic ethers and chain ethers can be used. Examples of the cyclic carbonates include ethylene carbonate (EC), propylene carbonate (PC), butylene carbonate (BC) and derivatives thereof (including fluorinated ones). Examples of the chain carbonates include dimethyl carbonate (DMC), diethyl carbonate (DEC), ethyl methyl carbonate (EMC), dipropyl carbonate (DPC) and derivatives thereof (including fluorinated ones). Examples of the aliphatic carboxylate esters include methyl formate, methyl acetate, ethyl propionate and derivatives thereof (including fluorinated ones). Examples of the γ-lactones include γ-butyrolactone and derivatives thereof (including fluorinated ones). Examples of the cyclic ethers include tetrahydrofuran, 2-methyltetrahydrofuran and derivatives thereof (including fluorinated ones). Examples of the chain ethers include 1,2-diethoxyethane (DEE), ethoxymethoxyethane (EME), diethyl ether and derivatives thereof (including fluorinated ones). As the nonaqueous solvents, other than these, dimethyl sulfoxide, 1,3-dioxolane, formamide, acetamide, dimethylformamide, dioxolane, acetonitrile, propylnitrile, nitromethane, ethyl monoglyme, phosphate triesters, trimethoxymethane, dioxolane derivatives, sulfolane, methylsulfolane, 1,3-dimethyl-2-imidazolidinone, 3-methyl-2-oxazolidinone, 1,3-propanesultone, anisole, N-methylpyrrolidone and derivatives thereof (including fluorinated ones) can also be used. These may be used singly or in combinations of two or more.

(A Negative Electrode)

As a negative electrode of the secondary battery according to the exemplary embodiment, one in which a negative electrode active material layer comprising a negative electrode active material and a binder for the negative electrode is disposed on a negative electrode current collector can be used.

As the negative electrode active material, at least one or more carbon materials, being capable of intercalating and releasing lithium, selected from a natural graphite, an artificial graphite, a non-graphitizable carbon and a graphitizable carbon can be used. It is preferable to use, as the negative electrode active material, one obtained by mixing two or more carbon materials. When the negative electrode active material obtained by mixing two or more carbon materials is used, the permeability of the electrolyte solution into the negative electrode active material layer and further the solution replenishability are improved and it presumably becomes easy for a good-quality film to be formed on the negative electrode active material.

As the material capable of intercalating and releasing lithium, in addition to the carbon materials, other negative electrode active materials such as silicon-based oxides may be added.

The content ratio of the carbon materials to the whole negative electrode active material is, from the viewpoint of providing desired battery characteristics such as low-temperature rate capability, preferably 70% by mass or higher, more preferably 80% by mass or higher, and still more preferably 90% by mass or higher.

Among the carbon materials as the negative electrode active material, the negative electrode active material comprises preferably 20% by mass of a graphite material (a natural graphite and/or an artificial graphite), more preferably 50% by mass or more thereof, and still more preferably 60% by mass or more thereof.

The graphite material is high in electronic conductivity, high in adhesiveness with a current collector composed of a metal such as copper, excellent in voltage flatness, and little in contained impurities because of being formed at a high treatment temperature, which are advantageous for the improvement of the negative electrode performance.

Examples of the natural graphite include scaly natural graphite, spherical natural graphite, massive natural graphite and amorphous natural graphite, and among these, the spherical natural graphite is preferable. Examples of the artificial graphite include massive artificial graphite, scaly artificial graphite, and spherical artificial graphite such as MCMB (mesophase carbon microbead), and among these, the massive artificial graphite is preferable.

Examples of the shape of the non-graphitizable carbon include massive, flaky and scaly ones, and among these, the massive shape is preferable. Examples of the shape of the graphitizable carbon include massive, flaky and scaly ones, and among these, the scaly shape is preferable.

In the exemplary embodiment, a combination of two or more carbon materials selected from a natural graphite, an artificial graphite, a non-graphitizable carbon and a graphitizable carbon is preferably used; a combination of a graphite material (a natural graphite, an artificial graphite) and a non-graphitizable carbon is more preferably used; and a combination of a natural graphite and a non-graphitizable carbon is still more preferably used. By using a combination of the negative electrode comprising a negative electrode active material being such a mixture of two or more carbon materials with the electrolyte solution comprising the cyclic disulfonate ester compound represented by the formula (1) and the acid anhydride, the improvement effect of the battery characteristics such as the low-temperature rate capability is enabled to be enhanced.

In the case of using a combination of a graphite material (a natural graphite, an artificial graphite) with a non-graphitizable carbon, the content of the non-graphitizable carbon in the carbon materials of the negative electrode active material is preferably in the range of 5% by mass to 80% by mass; and the content of the graphite material (the natural graphite or/and the artificial graphite) is preferably in the range of 20% by mass to 95% by mass.

It can be confirmed by a SEM (scanning microscope) observation that the shape of the carbon materials contained in the negative electrode active material is spherical or massive.

In a SEM image of the negative electrode active material, in the case where the axial length ratio (minor axis/major axis) of lengths in the minor axis direction (where the length between two points on the periphery is the shortest one) to in the major direction (where the length between two points on the periphery is the longest one) is higher than 0.2, the shape can be considered a spherical one or a massive one. Here, the axial length ratio (minor axis/major axis) of the spherical graphite is preferably 0.3 or higher, and more preferably 0.5 or higher.

The spherical graphite can be produced by using scaly graphite as the raw material, and has a structure in which the scaly graphite is folded up and spheronized. Hence, the spherical graphite exhibits schistosity observed therein, and has a cabbage-like appearance having the schistosity heading in various directions. Further the spherical graphite exhibits voids observed on the fracture surface. When the negative electrode active material comprises the spherical graphite, since the orientation of crystals is directed in various directions also after a rolling step in electrode fabrication, the migration of lithium ions between electrodes is made to take place easily. Further when the spherical graphite is used, voids suitable for holding the electrolyte solution among the negative electrode active material can be obtained, and thus a lithium secondary battery excellent in high-output characteristics can be obtained.

By contrast, the massive graphite has no such schistosity like that observed in the above spherical graphite, and has a homogeneous shape.

The average particle diameter $D_{50}$ of the carbon material to be used as the negative electrode active material is not especially limited, and is, for example, preferably in the range of 5 to 100 μm, and preferably in the range of 5 to 90 μm. The average particle diameter $D_{50}$ of the natural graphite is preferably in the range of 5 to 80 μm. The average particle diameter $D_{50}$ of the massive carbon material (the massive natural graphite, the massive artificial graphite, the massive non-graphitizable carbon, the massive graphitizable carbon) is, for example, preferably in the range of 5 to 40 μm. Here, the average particle diameter is a 50%-cumulative diameter $D_{50}$ (median diameter) acquired by a particle size distribution measurement using a laser diffraction scattering method.

The binder for the negative electrode is not especially limited, and polyvinylidene fluoride, vinylidene fluoride-hexafluoropropylene copolymers, vinylidene fluoride-tetrafluoroethylene copolymers, styrene-butadiene copolymerized rubber, polytetrafluoroethylene, polypropylene, polyethylene, polyimide, polyamideimide, and the like can be used. The binder for the negative electrode may be used singly or as a mixture of two or more.

The amount of the binder for the negative electrode is, from the viewpoint of a sufficient binding strength and the energy enhancement, which are in a tradeoff relationship, with respect to 100 parts by mass of the negative electrode active material, preferably in the range of 0.1 to 30% by mass, more preferably in the range of 0.5 to 20 parts by mass, and still more preferably in the range of 0.1 to 30% by mass.

The negative electrode current collector is not especially limited, and examples thereof include aluminum, nickel, copper, silver and alloys thereof, from the viewpoint of the electrochemical stability. Examples of the shape include foil, flat plate and mesh ones. The thickness of the negative electrode current collector is not especially limited, and can be set, for example, in the range of 5 to 50 μm, and is preferably in the range of 10 to 40 μm.

The negative electrode can be fabricated, for example, by forming a negative electrode active material layer comprising the negative electrode active material and the binder on the negative electrode current collector. The negative electrode active material layer can be formed by a common slurry applying method. Specifically, the negative electrode can be obtained by preparing a slurry comprising the negative electrode active material, the binder and a solvent, applying and drying the slurry on the negative electrode current collector, and as required, pressurizing the resultant. Examples of a method of applying the negative electrode slurry include a doctor blade method, a die coater method, and a dip coating method. The negative electrode may be obtained by previously forming the negative electrode active material layer and thereafter forming a thin film of copper, nickel or an alloy thereof as the current collector by a method of vapor deposition, sputtering or the like.

The negative electrode active material layer, from the viewpoint of improving the electroconductivity, may contain an electroconductive auxiliary agent such as carbon.

(A Positive Electrode)

As a positive electrode of the secondary battery according to the exemplary embodiment, one in which a positive electrode active material layer comprising a positive electrode active material and a binder for the positive electrode is disposed on a positive electrode current collector can be used.

The positive electrode active material is not especially limited, and examples thereof include lithium composite oxides and iron lithium phosphate. Further the lithium composite oxides may be ones in which at least a part of a transition metal of the lithium composite oxides is substituted with another element. Further a lithium composite oxide exhibiting a plateau potential of 4.2 V or higher vs. a metallic lithium counter electrode may be used. Examples of the lithium composite oxides include a spinel-type lithium manganese composite oxide, an olivine-type lithium-containing composite oxide, and an inverse spinel-type lithium-containing composite oxide.

Specific examples of the lithium composite oxides include lithium manganate ($LiMn_2O_4$); lithium cobaltate ($LiCoO_2$); lithium nickelate ($LiNiO_2$); compounds in which at least a part of manganese, cobalt or nickel of these lithium compounds is substituted with another metal element such as aluminum, magnesium, titanium, zinc or zirconium; nickel-substituted lithium manganates in which a part of manganese of lithium manganate is substituted at least with nickel; cobalt-substituted lithium nickelates in which a part of nickel of lithium nickelate is substituted at least with cobalt; compounds in which a part of manganese of the nickel-substituted lithium manganates is substituted with another metal (for example, at least one of aluminum, magnesium, titanium and zinc); and compounds in which a part of nickel of the cobalt-substituted lithium nickelates is substituted with another metal (for example, at least one of aluminum, magnesium, titanium and zinc). These lithium composite oxides may be used singly or as a mixture of two or more.

Examples of the lithium composite oxide suitable for the positive electrode active material of the secondary battery according to the exemplary embodiment include a compound represented by the following formula.

$$Li_a(M_xMn_{2-x})O_4$$

wherein x satisfies $0<x<2$; a satisfies $0<a<1.2$; and M is at least one element selected from the group consisting of Ni, Co, Fe, Cr and Cu.

With respect to the average particle diameter of the positive electrode active material, from the viewpoint of the reactivity with the electrolyte solution, the rate capability and the like, the positive electrode active material having an average particle diameter, for example, in the range of 0.1 to 50 μm can be used; preferably that having an average particle diameter in the range of 1 to 30 μm can be used; and more preferably that having an average particle diameter in the range of 5 to 25 μm can be used. Here, the average particle diameter means a particle diameter (median diameter: $D_{50}$) at a cumulative value of 50% in a particle size distribution (in terms of volume) by a laser diffraction scattering method.

The positive electrode can be fabricated, for example, by preparing a slurry comprising the positive electrode active material, the binder and a solvent (further, as required, an electroconductive auxiliary agent), applying and drying the slurry on the positive electrode current collector, and as required, pressurizing the resultant to thereby form a positive electrode active material layer on the positive electrode current collector.

The binder for the positive electrode is not especially limited, and the same ones as the binders for negative electrode can be used. Among these, from the viewpoint of the versatility and the low cost, polyvinylidene fluoride is preferable. The content of the binder for the positive electrode is, from the viewpoint of the binding strength and the energy density, which are in a tradeoff relationship, with respect to 100 parts by mass of the positive electrode active material, preferably in the range of 1 to 25 parts by mass, more preferably in the range of 2 to 20 parts by mass, and still more preferably in the range of 2 to 10 parts by mass. Examples of binders other than polyvinylidene fluoride (PVdF) include polyvinylidene fluoride-hexafluoropropylene copolymers, vinylidene fluoride-tetrafluoroethylene copolymers, styrene-butadiene copolymerized rubber, polytetrafluoroethylene, polypropylene, polyethylene, polyimide and polyamideimide. As the slurry solvent, N-methyl-2-pyrrolidone (NMP) can be used.

The positive electrode current collector is not especially limited, and examples thereof include aluminum, titanium, tantalum, nickel, silver and alloys thereof. Examples of the shape include foil, flat plate and mesh ones. Particularly an aluminum foil can suitably be used.

When a positive electrode is fabricated, for the purpose of reducing the impedance, an electroconductive auxiliary agent may be added. Examples of the electroconductive auxiliary agent include carbonaceous microparticles of graphite, carbon black, acetylene black or the like.

(The Secondary Battery, and a Production Method Thereof)

A production method of the secondary battery will be described by taking a production method of a secondary battery illustrated in FIG. 1 as one example. First, the positive electrode and the negative electrode fabricated according to the above are laminated with the intervention of a porous separator 5 in dry air or in an inert gas atmosphere. This laminate body may be wound. The laminate body may be made into an electrode group in which a plurality of electrode pairs is stacked. Then, the laminate body is accommodated in a casing such as a battery can or a flexible film composed of a laminate body of a synthetic resin and a metal foil. At this time, tabs 8 and 9 are exposed outside the casing. Then, the laminate body is impregnated with the nonaqueous electrolyte solution. Then, after the casing is sealed, charging of the secondary battery can be carried out to thereby form a good film on the negative electrode.

As the separator of the secondary battery according to the exemplary embodiment, a porous film composed of a resin of a polyolefin such as polypropylene or polyethylene, a fluororesin such as polyvinylidene fluoride, a polyimide, or the like can be used.

As the casing, any one can suitably be selected as long as being stable in the electrolyte solution and having a sufficient steam barrier property. For example, as the casing of a stacked laminate-type secondary battery, a laminate film using aluminum, and a laminate film using a propylene, polyethylene or the like coated with silica can be used. As a laminate film suitable for the casing, for example, one containing a resin base material, a metal foil layer and a thermal fusion layer (sealant) can be used. Examples of the resin base material include polyester and nylon; examples of the metal foil layer include aluminum, aluminum alloy and titanium foils; and examples of the material of the thermal fusion layer include thermoplastic polymeric materials such as polyethylene, polypropylene and polyethylene terephthalate. Further the resin base material layer and the metal foil layer are each not limited to of one layer, and may be of two or more layers. From the viewpoint of the versatility, the cost, the suppression of the volume expansion, and the like, an aluminum laminate film is preferably used.

EXAMPLES

Hereinafter, the exemplary embodiment according to the present invention will be described specifically by way of Examples, but the present invention is not limited thereto.

Example 1

A positive electrode was fabricated by using an aluminum foil of 20 μm in thickness as a positive electrode current collector and using $LiMn_2O_4$ as a positive electrode active material. At this time, a positive electrode active material layer was formed on the current collector by using a PVdF (manufactured by Kureha Corp., trade name: KF Polymer) as a binder and using an acetylene black (manufactured by Timcal Graphite & Carbon) as an electroconductivity imparting agent.

A negative electrode was fabricated by using a copper foil of 10 μm in thickness as a negative electrode current collector and using a spherical natural graphite (average particle diameter $D_{50}$=20 μm) as a negative electrode active material. The average particle diameter was determined from a particle size distribution measurement result in terms of volume by using a laser diffraction and scattering-type particle-diameter and particle-size distribution analyzer. In the production of the negative electrode, a negative electrode active material layer was formed on the current collector by using, with respect to 95% by mass of the spherical natural graphite, 2% by mass of a styrene-butadiene copolymerized rubber (SBR) as a binder, 1.5% by mass of a carboxymethylcellulose (CMC) as a thickener, and 1.5% by mass of a carbon black as an electroconductive material.

A secondary battery was fabricated by laminating the negative electrode and the positive electrode with the intervention of a separator composed of a polyethylene, and using an electrolyte solution fabricated as follows.

[Fabrication of a Nonaqueous Electrolyte Solution]

A mixed solvent (volume ratio: EC/DEC=30/70) of EC and DEC as a solvent of a nonaqueous electrolyte solution was used and $LiPF_6$ as a supporting electrolyte was dissolved in this solvent so as to become 1 M in a nonaqueous electrolyte solution.

A compound No. 4 indicated in the above Table 1 was added as an additive so as to be contained in 0.1 mol/L in the nonaqueous electrolyte solution. Further maleic anhydride (CA-1) as an acid anhydride was added so as to have the concentration indicated in Table 1.

A lithium ion secondary battery was fabricated by using the resulting nonaqueous electrolyte solution, and the evaluation of the rate capability at low temperature was carried out as follows.

[Evaluation Method of the Low-Temperature Rate Capability]

1 C-discharge characteristics were measured at 25° C. and −20° C. The conditions at this time, determined from design values, were set at a CCVV charge rate of 1.0 C, a CC discharge rate of 1.0 C, an end-of-charge voltage of 4.15 V, and an end-of-discharge voltage of 2.5 V.

First, in a thermostatic chamber of 25° C., after charging was carried out, 1C-discharging was carried out, and the discharge capacity was measured. Then, in a thermostatic chamber of −20° C., after charging was carried out, 1C-discharging was carried out and the discharge capacity was measured.

The ratio (capacity ratio) of a discharge capacity at −20° C. to a discharge capacity at 25° C. was taken as an index of the low-temperature rate capability. That is, a numerical value determined by the following expression was defined as a low-temperature rate capability. The result is shown in Table 2.

Low-temperature rate capability (%)=100×(discharge capacity at −20° C.)/(discharge capacity at 25° C.)

Example 2

A secondary battery was fabricated as in Example 1, except for using 95% by mass of a massive artificial graphite (average particle diameter $D_{50}$=10 μm) as a negative electrode active material in place of the spherical natural graphite (average particle diameter $D_{50}$=20 μm). For this secondary battery, the low-temperature rate capability of the battery was evaluated as in Example 1. The result is shown in Table 2.

Example 3

A secondary battery was fabricated as in Example 1, except for using 95% by mass of a massive non-graphitizable carbon (average particle diameter $D_{50}$=9 μm) as a negative electrode active material in place of the spherical natural graphite (average particle diameter $D_{50}$=20 μm). For this secondary battery, the low-temperature rate capability of the battery was evaluated as in Example 1. The result is shown in Table 2.

Example 4

A secondary battery was fabricated as in Example 1, except for using 95% by mass of a scaly graphitizable carbon (average particle diameter $D_{50}$=12 μm) as a negative electrode active material in place of the spherical natural graphite (average particle diameter $D_{50}$=20 μm). For this secondary battery, the low-temperature rate capability of the battery was evaluated as in Example 1. The result is shown in Table 2.

Example 5

A secondary battery was fabricated as in Example 1, except for using 68% by mass of a spherical natural graphite (average particle diameter $D_{50}$=20 μm) and 27% by mass of a massive non-graphitizable carbon (average particle diameter $D_{50}$=9 μm) as a negative electrode active material. For this secondary battery, the low-temperature rate capability of the battery was evaluated as in Example 1. The result is shown in Table 2.

Example 6

A secondary battery was fabricated as in Example 1, except for using 27% by mass of a spherical natural graphite (average particle diameter $D_{50}$=20 μm) and 68% by mass of a massive non-graphitizable carbon (average particle diameter $D_{50}$=9 μm) as a negative electrode active material. For this secondary battery, the low-temperature rate capability of the battery was evaluated as in Example 1. The result is shown in Table 2.

Example 7

A secondary battery was fabricated as in Example 1, except for using 63% by mass of a spherical natural graphite (average particle diameter $D_{50}$=20 μm), 22% by mass of a massive artificial graphite (average particle diameter $D_{50}$=10 μm) and 10% by mass of a massive non-graphitizable carbon (average particle diameter $D_{50}$=9 μm) as a negative electrode active material. For this secondary battery, the low-temperature rate capability of the battery was evaluated as in Example 1. The result is shown in Table 2.

Example 8

A secondary battery was fabricated as in Example 1, except for using 22% by mass of a spherical natural graphite (average particle diameter $D_{50}$=20 μm), 63% by mass of a massive artificial graphite (average particle diameter $D_{50}$=10 μm) and 10% by mass of a massive non-graphitizable carbon (average particle diameter $D_{50}$=9 μm) as a negative electrode active material. For this secondary battery, the low-temperature rate capability of the battery was evaluated as in Example 1. The result is shown in Table 2.

Example 9

A secondary battery was fabricated as in Example 1, except for using 22% by mass of a spherical natural graphite (average particle diameter $D_{50}$=20 μm), 63% by mass of a massive artificial graphite (average particle diameter $D_{50}$=10 μm), 5% by mass of a massive non-graphitizable carbon (average particle diameter $D_{50}$=9 μm) and 5% by mass of a scaly graphitizable carbon (average particle diameter $D_{50}$=12 μm) as a negative electrode active material. For this secondary battery, the low-temperature rate capability of the battery was evaluated as in Example 1. The result is shown in Table 2.

Example 10

A secondary battery was fabricated as in Example 1, except for using 68% by mass of a massive artificial graphite (average particle diameter $D_{50}$=10 μm) and 27% by mass of a massive non-graphitizable carbon (average particle diameter $D_{50}$=9 μm) as a negative electrode active material. For this secondary battery, the low-temperature rate capability of the battery was evaluated as in Example 1. The result is shown in Table 2.

Examples 11 to 20

In Examples 11 to 20, secondary batteries were fabricated as in Examples 1 to 10, respectively, except for using, as indicated in Table 3, the compound No. 5 as the additive indicated in Table 1. For these secondary batteries, the low-temperature rate capabilities of the batteries were evaluated as in Example 1. The results are shown in Table 3.

Examples 21 to 30

In Examples 21 to 30, secondary batteries were fabricated as in Examples 1 to 10, respectively, except for using, as indicated in Table 4, the compound No. 2 as the additive indicated in Table 1. For these secondary batteries, the low-temperature rate capabilities of the batteries were evaluated as in Example 1. The results are shown in Table 4.

Examples 31 to 40

In Examples 31 to 40, secondary batteries were fabricated as in Examples 1 to 10, respectively, except for using, as indicated in Table 5, the compound No. 7 as the additive indicated in Table 1. For these secondary batteries, the low-temperature rate capabilities of the batteries were evaluated as in Example 1. The results are shown in Table 5.

Examples 41 to 50

In Examples 41 to 50, secondary batteries were fabricated as in Examples 1 to 10, respectively, except for using, as indicated in Table 6, the compound No. 1 as the additive indicated in Table 1. For these secondary batteries, the low-temperature rate capabilities of the batteries were evaluated as in Example 1. The results are shown in Table 6.

Examples 51 and 52

In Examples 51 and 52, secondary batteries were fabricated as in Examples 5 and 6, respectively, except for using, as indicated in Table 6, the compound No. 1 as the additive indicated in Table 1, and succinic anhydride (CA-2) as the acid anhydride. For these secondary batteries, the low-temperature rate capabilities of the batteries were evaluated as in Example 1. The results are shown in Table 6.

Examples 53 and 54

In Examples 53 to 54, secondary batteries (corresponding to Examples 45 and 46, respectively) were fabricated as in Examples 5 and 6, respectively, except for using, as indicated in Table 8, the compound No. 1 as the additive indicated in Table 1. For these secondary batteries, the low-temperature rate capabilities of the batteries were evaluated as in Example 1 after a storage test in a charged state at 45° C. for 3 months. The results are shown in Table 8.

Examples 55 and 56

In Examples 55 to 56, secondary batteries were fabricated as in Examples 53 and 54, respectively, except for using, as indicated in Table 8, methylene methanedisulfonate (MMDS) (in the formula (1), $R_1$ and $R_2$ are hydrogen atoms, and $R_3$ is a methylene group) in place of the compound No. 1. For these secondary batteries, the low-temperature rate capabilities of the batteries were evaluated as in Example 1 after a storage test in a charged state at 45° C. for 3 months. The results are shown in Table 8.

Examples 57 and 58

In Examples 57 and 58, secondary batteries were fabricated as in Examples 5 and 6, respectively, except for using, as indicated in Table 6, methylene methanedisulfonate (MMDS) (in the formula (1), $R_1$ and $R_2$ are hydrogen atoms, and $R_3$ is a methylene group) in place of the compound No. 1, and succinic anhydride (CA-2) as the acid anhydride. For these secondary batteries, the low-temperature rate capabilities of the batteries were evaluated as in Example 1.
The results are shown in Table 6.

Examples 59 and 60

In Examples 59 and 60, secondary batteries were fabricated as in Examples 5 and 6, respectively, except for using, as indicated in Table 6, methylene methanedisulfonate (MMDS) (in the formula (1), $R_1$ and $R_2$ are hydrogen atoms, and $R_3$ is a methylene group) in place of the compound No. 1, and the fluorinated succinic anhydride (CA-3) represented by the formula (a) as the acid anhydride. For these secondary batteries, the low-temperature rate capabilities of the batteries were evaluated as in Example 1. The results are shown in Table 6.

Example 61

In Example 61, a secondary battery was fabricated as in Example 10, except for using, as indicated in Table 6, methylene methanedisulfonate (MMDS) (in the formula (1), $R_1$ and $R_2$ are hydrogen atoms, and $R_3$ is a methylene group) in place of the compound No. 1, and the fluorinated glutaric anhydride (CA-4) represented by the formula (b) as the acid anhydride. For this secondary battery, the low-temperature rate capability of the battery was evaluated as in Example 1. The result is shown in Table 6.

Example 62

A secondary battery was fabricated as in Example 61, except for altering the mixing ratio of the active material to that indicated in Table 6. For this secondary battery, the low-temperature rate capability of the battery was evaluated as in Example 1. The result is shown in Table 6.

Comparative Example 1

A secondary battery was fabricated as in Example 1, except for using methylene methanedisulfonate (MMDS) (in the formula (1), $R_1$ and $R_2$ are hydrogen atoms, and $R_3$ is a methylene group) in place of the compound No. 4 as the additive to the electrolyte solution, and adding no acid anhydride CA-1; and then the low-temperature rate capability of the battery was evaluated as in Example 1. The result is shown in Table 7.

Comparative Example 2

A secondary battery was fabricated as in Example 2, except for using methylene methanedisulfonate (MMDS) in place of the compound No. 4 as the additive to the electrolyte solution, and adding no acid anhydride CA-1; and then the low-temperature rate capability of the battery was evaluated as in Example 1. The result is shown in Table 7.

Comparative Example 3

A secondary battery was fabricated as in Example 3, except for using methylene methanedisulfonate (MMDS) in place of the compound No. 4 as the additive to the electrolyte solution, and adding no acid anhydride CA-1; and then the low-temperature rate capability of the battery was evaluated as in Example 1. The result is shown in Table 7.

Comparative Example 4

A secondary battery was fabricated as in Example 4, except for using methylene methanedisulfonate (MMDS) in place of the compound No. 4 as the additive to the electrolyte solution, and adding no acid anhydride CA-1; and then the low-temperature rate capability of the battery was evaluated as in Example 1. The result is shown in Table 7.

TABLE 2

| | Negative Electrode Active materials | | | | Mixing Ratio of Active materials | | | | Additives in Electrolyte Solution | | | | Low-Temperature Rate Capability (%) |
|---|---|---|---|---|---|---|---|---|---|---|---|---|---|
| | | | | | First Carbon | Second Carbon | Third Carbon | Fourth Carbon | Kind of | Content of Com- | Kind of Acid | Content of Acid | |
| | First Carbon | Second Carbon | Third Carbon | Fourth Carbon | (% by mass) | (% by mass) | (% by mass) | (% by mass) | Com-pound | pound (mol/L) | Anhy-dride | Anhydride (mol/L) | |
| Example 1 | Natural graphite | | | | 95 | | | | No. 4 | 0.1 | CA-1 | 0.1 | 78 |
| Example 2 | | Artificial graphite | | | | 95 | | | No. 4 | 0.1 | CA-1 | 0.1 | 79 |
| Example 3 | | | Non-graph-itizable carbon | | | | 95 | | No. 4 | 0.1 | CA-1 | 0.1 | 81 |
| Example 4 | | | | Graphi-tizable carbon | | | | 95 | No. 4 | 0.1 | CA-1 | 0.1 | 76 |
| Example 5 | Natural graphite | | Non-graph-itizable carbon | | 68 | | 27 | | No. 4 | 0.1 | CA-1 | 0.1 | 93 |
| Example 6 | Natural graphite | | Non-graph-itizable carbon | | 27 | | 68 | | No. 4 | 0.1 | CA-1 | 0.1 | 92 |
| Example 7 | Natural graphite | Artificial graphite | Non-graph-itizable carbon | | 63 | 22 | 10 | | No. 4 | 0.1 | CA-1 | 0.1 | 89 |
| Example 8 | Natural graphite | Artificial graphite | Non-graph-itizable carbon | | 22 | 63 | 10 | | No. 4 | 0.1 | CA-1 | 0.1 | 89 |
| Example 9 | Natural graphite | Artificial graphite | Non-graph-itizable carbon | Graphi-tizable carbon | 22 | 63 | 5 | 5 | No. 4 | 0.1 | CA-1 | 0.1 | 87 |
| Example 10 | | Artificial graphite | Non-graph-itizable carbon | | | 68 | 27 | | No. 4 | 0.1 | CA-1 | 0.1 | 93 |

TABLE 3

| | Negative Electrode Active materials | | | | Mixing Ratio of Active materials | | | | Additives in Electrolyte Solution | | | | Low-Temperature Rate Capability (%) |
|---|---|---|---|---|---|---|---|---|---|---|---|---|---|
| | | | | | First Carbon | Second Carbon | Third Carbon | Fourth Carbon | Kind of | Content of Com- | Kind of Acid | Content of Acid | |
| | First Carbon | Second Carbon | Third Carbon | Fourth Carbon | (% by mass) | (% by mass) | (% by mass) | (% by mass) | Com-pound | pound (mol/L) | Anhy-dride | Anhydride (mol/L) | |
| Example 11 | Natural graphite | | | | 95 | | | | No. 5 | 0.1 | CA-1 | 0.1 | 79 |
| Example 12 | | Artificial graphite | | | | 95 | | | No. 5 | 0.1 | CA-1 | 0.1 | 80 |
| Example 13 | | | Non-graph-itizable carbon | | | | 95 | | No. 5 | 0.1 | CA-1 | 0.1 | 82 |
| Example 14 | | | | Graphi-tizable carbon | | | | 95 | No. 5 | 0.1 | CA-1 | 0.1 | 77 |
| Example 15 | Natural graphite | | Non-graph-itizable carbon | | 68 | | 27 | | No. 5 | 0.1 | CA-1 | 0.1 | 94 |
| Example 16 | Natural graphite | | Non-graph-itizable carbon | | 27 | | 68 | | No. 5 | 0.1 | CA-1 | 0.1 | 93 |
| Example 17 | Natural graphite | Artificial graphite | Non-graph-itizable carbon | | 63 | 22 | 10 | | No. 5 | 0.1 | CA-1 | 0.1 | 90 |
| Example 18 | Natural graphite | Artificial graphite | Non-graph-itizable carbon | | 22 | 63 | 10 | | No. 5 | 0.1 | CA-1 | 0.1 | 90 |
| Example 19 | Natural graphite | Artificial graphite | Non-graph-itizable carbon | Graphi-tizable carbon | 22 | 63 | 5 | 5 | No. 5 | 0.1 | CA-1 | 0.1 | 88 |

TABLE 3-continued

| | Negative Electrode Active materials | | | | Mixing Ratio of Active materials | | | | Additives in Electrolyte Solution | | | | Low-Temperature Rate Capability (%) |
|---|---|---|---|---|---|---|---|---|---|---|---|---|---|
| | First Carbon | Second Carbon | Third Carbon | Fourth Carbon | First Carbon (% by mass) | Second Carbon (% by mass) | Third Carbon (% by mass) | Fourth Carbon (% by mass) | Kind of Compound | Content of Compound (mol/L) | Kind of Acid Anhydride | Content of Acid Anhydride (mol/L) | |
| Example 20 | | Artificial graphite | Non-graphitizable carbon | | | 68 | 27 | | No. 5 | 0.1 | CA-1 | 0.1 | 94 |

TABLE 4

| | Negative Electrode Active materials | | | | Mixing Ratio of Active materials | | | | Additives in Electrolyte Solution | | | | Low-Temperature Rate Capability (%) |
|---|---|---|---|---|---|---|---|---|---|---|---|---|---|
| | First Carbon | Second Carbon | Third Carbon | Fourth Carbon | First Carbon (% by mass) | Second Carbon (% by mass) | Third Carbon (% by mass) | Fourth Carbon (% by mass) | Kind of Compound | Content of Compound (mol/L) | Kind of Acid Anhydride | Content of Acid Anhydride (mol/L) | |
| Example 21 | Natural graphite | | | | 95 | | | | No. 2 | 0.1 | CA-1 | 0.1 | 80 |
| Example 22 | | Artificial graphite | | | | 95 | | | No. 2 | 0.1 | CA-1 | 0.1 | 81 |
| Example 23 | | | Non-graphitizable carbon | | | | 95 | | No. 2 | 0.1 | CA-1 | 0.1 | 83 |
| Example 24 | | | | Graphitizable carbon | | | | 95 | No. 2 | 0.1 | CA-1 | 0.1 | 78 |
| Example 25 | Natural graphite | | Non-graphitizable carbon | | 68 | | 27 | | No. 2 | 0.1 | CA-1 | 0.1 | 95 |
| Example 26 | Natural graphite | | Non-graphitizable carbon | | 27 | | 68 | | No. 2 | 0.1 | CA-1 | 0.1 | 94 |
| Example 27 | Natural graphite | Artificial graphite | Non-graphitizable carbon | | 63 | 22 | 10 | | No. 2 | 0.1 | CA-1 | 0.1 | 91 |
| Example 28 | Natural graphite | Artificial graphite | Non-graphitizable carbon | | 22 | 63 | 10 | | No. 2 | 0.1 | CA-1 | 0.1 | 91 |
| Example 29 | Natural graphite | Artificial graphite | Non-graphitizable carbon | Graphitizable carbon | 22 | 63 | 5 | 5 | No. 2 | 0.1 | CA-1 | 0.1 | 89 |
| Example 30 | | Artificial graphite | Non-graphitizable carbon | | | 68 | 27 | | No. 2 | 0.1 | CA-1 | 0.1 | 95 |

TABLE 5

| | Negative Electrode Active materials | | | | Mixing Ratio of Active materials | | | | Additives in Electrolyte Solution | | | | Low-Temperature Rate Capability (%) |
|---|---|---|---|---|---|---|---|---|---|---|---|---|---|
| | First Carbon | Second Carbon | Third Carbon | Fourth Carbon | First Carbon (% by mass) | Second Carbon (% by mass) | Third Carbon (% by mass) | Fourth Carbon (% by mass) | Kind of Compound | Content of Compound (mol/L) | Kind of Acid Anhydride | Content of Acid Anhydride (mol/L) | |
| Example 31 | Natural graphite | | | | 95 | | | | No. 7 | 0.1 | CA-1 | 0.1 | 81 |
| Example 32 | | Artificial graphite | | | | 95 | | | No. 7 | 0.1 | CA-1 | 0.1 | 82 |

TABLE 5-continued

| | Negative Electrode Active materials | | | | Mixing Ratio of Active materials | | | | Additives in Electrolyte Solution | | | | Low-Temperature Rate Capability (%) |
|---|---|---|---|---|---|---|---|---|---|---|---|---|---|
| | First Carbon | Second Carbon | Third Carbon | Fourth Carbon | First Carbon (% by mass) | Second Carbon (% by mass) | Third Carbon (% by mass) | Fourth Carbon (% by mass) | Kind of Compound | Content of Compound (mol/L) | Kind of Acid Anhydride | Content of Acid Anhydride (mol/L) | |
| Example 33 | | | Non-graphitizable carbon | | | | 95 | | No. 7 | 0.1 | CA-1 | 0.1 | 84 |
| Example 34 | | | | Graphitizable carbon | | | | 95 | No. 7 | 0.1 | CA-1 | 0.1 | 79 |
| Example 35 | Natural graphite | | Non-graphitizable carbon | | 68 | | 27 | | No. 7 | 0.1 | CA-1 | 0.1 | 96 |
| Example 36 | Natural graphite | | Non-graphitizable carbon | | 27 | | 68 | | No. 7 | 0.1 | CA-1 | 0.1 | 95 |
| Example 37 | Natural graphite | Artificial graphite | Non-graphitizable carbon | | 63 | 22 | 10 | | No. 7 | 0.1 | CA-1 | 0.1 | 92 |
| Example 38 | Natural graphite | Artificial graphite | Non-graphitizable carbon | | 22 | 63 | 10 | | No. 7 | 0.1 | CA-1 | 0.1 | 92 |
| Example 39 | Natural graphite | Artificial graphite | Non-graphitizable carbon | Graphitizable carbon | 65 | 22 | 5 | 5 | No. 7 | 0.1 | CA-1 | 0.1 | 90 |
| Example 40 | | Artificial graphite | Non-graphitizable carbon | | | 68 | 27 | | No. 7 | 0.1 | CA-1 | 0.1 | 96 |

TABLE 6

| | Negative Electrode Active materials | | | | Mixing Ratio of Active materials | | | | Additives in Electrolyte Solution | | | | Low-Temperature Rate Capability (%) |
|---|---|---|---|---|---|---|---|---|---|---|---|---|---|
| | First Carbon | Second Carbon | Third Carbon | Fourth Carbon | First Carbon (% by mass) | Second Carbon (% by mass) | Third Carbon (% by mass) | Fourth Carbon (% by mass) | Kind of Compound | Content of Compound (mol/L) | Kind of Acid Anhydride | Content of Acid Anhydride (mol/L) | |
| Example 41 | Natural graphite | | | | 95 | | | | No. 1 | 0.1 | CA-1 | 0.1 | 82 |
| Example 42 | | Artificial graphite | | | | 95 | | | No. 1 | 0.1 | CA-1 | 0.1 | 83 |
| Example 43 | | | Non-graphitizable carbon | | | | 95 | | No. 1 | 0.1 | CA-1 | 0.1 | 85 |
| Example 44 | | | | Graphitizable carbon | | | | 95 | No. 1 | 0.1 | CA-1 | 0.1 | 80 |
| Example 45 | Natural graphite | | Non-graphitizable carbon | | 68 | | 27 | | No. 1 | 0.1 | CA-1 | 0.1 | 97 |
| Example 46 | Natural graphite | | Non-graphitizable carbon | | 27 | | 68 | | No. 1 | 0.1 | CA-1 | 0.1 | 96 |
| Example 47 | Natural graphite | Artificial graphite | Non-graphitizable carbon | | 63 | 22 | 10 | | No. 1 | 0.1 | CA-1 | 0.1 | 93 |
| Example 48 | Natural graphite | Artificial graphite | Non-graphitizable carbon | | 22 | 63 | 10 | | No. 1 | 0.1 | CA-1 | 0.1 | 93 |
| Example 49 | Natural graphite | Artificial graphite | Non-graphitizable carbon | Graphitizable carbon | 22 | 63 | 5 | 5 | No. 1 | 0.1 | CA-1 | 0.1 | 91 |
| Example 50 | | Artificial graphite | Non-graphitizable carbon | | | 68 | 27 | | No. 1 | 0.1 | CA-1 | 0.1 | 96 |

TABLE 6-continued

| | Negative Electrode Active materials | | | | Mixing Ratio of Active materials | | | | Additives in Electrolyte Solution | | | | Low-Temperature Rate Capability (%) |
|---|---|---|---|---|---|---|---|---|---|---|---|---|---|
| | First Carbon | Second Carbon | Third Carbon | Fourth Carbon | First Carbon (% by mass) | Second Carbon (% by mass) | Third Carbon (% by mass) | Fourth Carbon (% by mass) | Kind of Compound | Content of Compound (mol/L) | Kind of Acid Anhydride | Content of Acid Anhydride (mol/L) | |
| Example 51 | Natural graphite | | Non-graphitizable carbon | | 68 | | 27 | | No. 1 | 0.1 | CA-2 | 0.1 | 97 |
| Example 52 | Natural graphite | | Non-graphitizable carbon | | 27 | | 68 | | No. 1 | 0.1 | CA-2 | 0.1 | 97 |
| Example 57 | Natural graphite | | Non-graphitizable carbon | | 68 | | 27 | | MMDS | 0.1 | CA-2 | 0.1 | 93 |
| Example 58 | Natural graphite | | Non-graphitizable carbon | | 27 | | 68 | | MMDS | 0.1 | CA-2 | 0.1 | 92 |
| Example 59 | Natural graphite | | Non-graphitizable carbon | | 68 | | 27 | | MMDS | 0.1 | CA-3 | 0.1 | 98 |
| Example 60 | Natural graphite | | Non-graphitizable carbon | | 27 | | 68 | | MMDS | 0.1 | CA-3 | 0.1 | 97 |
| Example 61 | | Artificial graphite | Non-graphitizable carbon | | 68 | | 27 | | MMDS | 0.1 | CA-4 | 0.1 | 98 |
| Example 62 | | Artificial graphite | Non-graphitizable carbon | | 27 | | 68 | | MMDS | 0.1 | CA-4 | 0.1 | 97 |

TABLE 7

| | Negative Electrode Active materials | | | | Mixing Ratio of Active materials | | | | Additives in Electrolyte Solution | | | | Low-Temperature Rate Capability (%) |
|---|---|---|---|---|---|---|---|---|---|---|---|---|---|
| | First Carbon | Second Carbon | Third Carbon | Fourth Carbon | First Carbon (% by mass) | Second Carbon (% by mass) | Third Carbon (% by mass) | Fourth Carbon (% by mass) | Kind of Compound | Content of Compound (mol/L) | Kind of Acid Anhydride | Content of Acid Anhydride (mol/L) | |
| Comparative Example 1 | Natural graphite | | | | 95 | | | | MMDS | 0.1 | None | | 57 |
| Comparative Example 2 | | Artificial graphite | | | | 95 | | | MMDS | 0.1 | None | | 58 |
| Comparative Example 3 | | | Non-graphitizable carbon | | | | 95 | | MMDS | 0.1 | None | | 56 |
| Comparative Example 4 | | | | Graphitizable carbon | | | | 95 | MMDS | 0.1 | None | | 55 |

TABLE 8

| | Negative Electrode Active materials | | | | Mixing Ratio of Active materials | | | | Additives in Electrolyte Solution | | | | Low-Temperature Rate Capability (%) |
|---|---|---|---|---|---|---|---|---|---|---|---|---|---|
| | First Carbon | Second Carbon | Third Carbon | Fourth Carbon | First Carbon (% by mass) | Second Carbon (% by mass) | Third Carbon (% by mass) | Fourth Carbon (% by mass) | Kind of Compound | Content of Compound (mol/L) | Kind of Acid Anhydride | Content of Acid Anhydride (mol/L) | |
| Example 53 | Natural graphite | | Non-graphitizable carbon | | 68 | | 27 | | No. 1 | 0.1 | CA-1 | 0.1 | 96 |

TABLE 8-continued

| | Negative Electrode Active materials | | | | Mixing Ratio of Active materials | | | | Additives in Electrolyte Solution | | | | Low-Temperature Rate Capability (%) |
|---|---|---|---|---|---|---|---|---|---|---|---|---|---|
| | First Carbon | Second Carbon | Third Carbon | Fourth Carbon | First Carbon (% by mass) | Second Carbon (% by mass) | Third Carbon (% by mass) | Fourth Carbon (% by mass) | Kind of Compound | Content of Compound (mol/L) | Kind of Acid Anhydride | Content of Acid Anhydride (mol/L) | |
| Example 54 | Natural graphite | Non-graphitizable carbon | | | 27 | | 68 | | No. 1 | 0.1 | CA-1 | 0.1 | 95 |
| Example 55 | Natural graphite | Non-graphitizable carbon | | | 68 | | 27 | | MMDS | 0.1 | CA-1 | 0.1 | 93 |
| Example 56 | Natural graphite | Non-graphitizable carbon | | | 27 | | 68 | | MMDS | 0.1 | CA-1 | 0.1 | 92 |

With respect to the evaluation results of the low-temperature rate capabilities indicated in Tables 2 to 8, comparing Examples 1 to 62, and Comparative Examples 1 to 4, in which no acid anhydride was added, it becomes clear that the low-temperature rate capabilities of Examples 1 to 62 were improved. As indicated by the results of Comparative Examples 1 to 4 of Table 7, it becomes clear that when no acid anhydride was added, a sufficient improvement effect of the low-temperature rate capability could not be provided.

It further becomes clear that when a combination of the non-graphitizable carbon and the natural graphite or the artificial graphite was used as the negative electrode active material, the low-temperature rate capability was further improved. It is conceivable that the use of such carbon-based negative electrode active material and the use of the electrolyte solution comprising the specific cyclic disulfonate ester compound and the acid anhydride form a low-resistance SEI film on the negative electrode and allow electro-conductive paths among negative electrode active material particles to be held in a low-resistance state and further, good Li paths in the negative electrode to be formed, to thereby improve the low-temperature rate capability.

As indicated in Table 8, the low-temperature rate capabilities after the storage test of the secondary batteries were more improved in Examples 53 and 54 than in Examples 55 and 56. That is, the storage characteristics (performance retention characteristics in the storage state) of the secondary batteries were improved. The use of the electrolyte solution comprising the cyclic disulfonate ester compound (at least one of $R_1$ and $R_2$ was substituted with an alkyl group or the like) having the specific structure represented by the formula (1) and the acid anhydride presumably decreased the reactivity with decomposition products of the supporting salt. Hence, it is conceivable that the stability of the electrolyte solution was improved; a low-resistance film was formed; and the low-temperature rate capabilities after the storage test of the secondary batteries were improved.

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

The lithium ion secondary battery according to the exemplary embodiment of the present invention is applicable to storage batteries for driving devices for electric cars, plug-in hybrid cars, electric motorcycles and power-assisted bicycles, tools such as electrically driven tools, electronic devices such as personal digital assistances and laptop computers, household power storage systems, photovoltaic power generation systems, and the like.

REFERENCE SIGNS LIST

1 Positive electrode active material layer
2 Negative electrode active material layer
3 Positive electrode current collector
4 Negative electrode current collector
5 Porous separator
6 Laminate casing
7 Laminate casing
8 Negative electrode tab
9 Positive electrode tab The present application claims the rights of priorities based on Japanese Patent Application No. 2013-189543 filed on Sep. 12, 2013, and Japanese Patent Application No. 2014-121472 filed on Jun. 12, 2014, the entire contents of which are incorporated herein by reference.

The invention claimed is:

1. A lithium ion secondary battery, comprising:
a positive electrode;
a negative electrode comprising a negative electrode active material, the negative electrode active material comprising a non-graphitizable carbon and a natural graphite or an artificial graphite; and
an electrolyte solution comprising a cyclic disulfonate ester compound represented by the following formula (1) and a carboxylic acid anhydride:

[Formula 1]

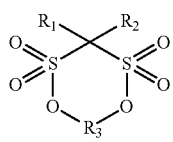

(1)

wherein $R_1$ and $R_2$ are each independently a hydrogen atom, a methyl group, or an ethyl group; and $R_3$ represents a methylene group (—$CH_2$—), an ethylene group (—$CH_2CH_2$—), or a methyl methylene group (—$CH(CH_3)$—), wherein a molar ratio B/A of a content B in the electrolyte solution of the carboxylic acid anhydride to a content A in the electrolyte solution of the cyclic disulfonate ester compound is in the range of 1/9 to 9/1.

2. The lithium ion secondary battery according to claim 1, wherein the carbon material of the negative electrode active material has a content of the non-graphitizable carbon in the range of 5% by mass to 80% by mass, and a content of the natural graphite or/and the artificial graphite in the range of 20% by mass to 95% by mass.

3. The lithium ion secondary battery according to claim 1, wherein the negative electrode active material comprises a non-graphitizable carbon and a natural graphite.

4. The lithium ion secondary battery according to claim 1, wherein the non-graphitizable carbon is a massive non-graphitizable carbon; the natural graphite is a spherical natural graphite; and the artificial graphite is a massive artificial graphite.

5. The lithium ion secondary battery according to claim 1, wherein at least one of the non-graphitizable carbon, the natural graphite, or the artificial graphite have an average particle diameter in the range of 5 to 90 μm.

6. The lithium ion secondary battery according to claim 1, wherein the content A in the electrolyte solution of the cyclic disulfonate ester compound is in the range of 0.01 mol/L to 1 mol/L; and the content B in the electrolyte solution of the carboxylic acid anhydride is in the range of 0.01 mol/L to 1 mol/L.

7. The lithium ion secondary battery according to claim 1, wherein the carboxylic acid anhydride is at least one selected from the group consisting of maleic anhydride, succinic anhydride, fluorinated succinic anhydride represented by the formula (a) and fluorinated glutaric anhydride represented by the formula (b):

[Formula 2]

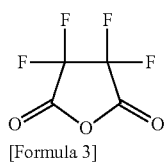

(a)

[Formula 3]

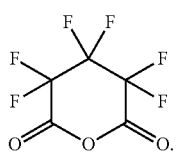

(b)

8. The lithium ion secondary battery according to claim 1, wherein in the formula (1), at least one of $R_1$ and $R_2$ is a methyl group or an ethyl group.

9. The lithium ion secondary battery according to claim 1, wherein in the formula (1), one of $R_1$ and $R_2$ is a methyl group or an ethyl group, and the other thereof is a hydrogen atom.

10. The lithium ion secondary battery according to claim 1, wherein in the formula (1), $R_1$ and $R_2$ are hydrogen atoms.

11. The lithium ion secondary battery according to claim 1, wherein in the formula (1), $R_3$ is a methylene group or an ethylene group.

12. A lithium ion secondary battery, comprising:
a positive electrode;
a negative electrode comprising a negative electrode active material, the negative electrode active material comprising a non-graphitizable carbon and a natural graphite or an artificial graphite; and
an electrolyte solution comprising a cyclic disulfonate ester compound represented by the following formula (1) and a carboxylic acid anhydride:

[Formula 1]

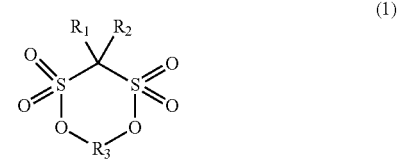

(1)

wherein $R_1$ and $R_2$ are each independently a hydrogen atom, a methyl group, or an ethyl group; and $R_3$ represents a methylene group (—$CH_2$—), an ethylene group (—$CH_2CH_2$—) or a methyl methylene group (—$CH(CH_3)$—),
wherein the carbon material of the negative electrode active material has a content of the non-graphitizable carbon in the range of 5% by mass to 80% by mass, and a content of the natural graphite or/and the artificial graphite in the range of 20% by mass to 95% by mass.

13. A lithium ion secondary battery, comprising:
a positive electrode;
a negative electrode comprising a negative electrode active material, the negative electrode active material comprising a non-graphitizable carbon and a natural graphite or an artificial graphite; and
an electrolyte solution comprising a cyclic disulfonate ester compound represented by the following formula (1) and a carboxylic acid anhydride:

[Formula 1]

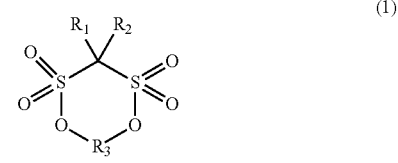

(1)

wherein $R_1$ and $R_2$ are each independently a hydrogen atom, a methyl group, or an ethyl group; and $R_3$ represents a methylene group (—$CH_2$—), an ethylene group (—$CH_2CH_2$—) or a methyl methylene group (—$CH(CH_3)$—),
wherein at least one of the non-graphitizable carbon, the natural graphite, or the artificial graphite have an average particle diameter in the range of 5 to 90 μm.

14. A lithium ion secondary battery, comprising:
a positive electrode;
a negative electrode comprising a negative electrode active material, the negative electrode active material comprising a non-graphitizable carbon and a natural graphite or an artificial graphite; and
an electrolyte solution comprising a cyclic disulfonate ester compound represented by the following formula (1) and a carboxylic acid anhydride:

[Formula 1]
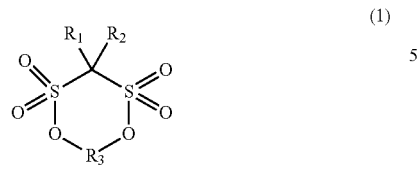
(1)
wherein $R_1$ and $R_2$ are hydrogen atoms; and $R_3$ represents a methylene group (—$CH_2$—), an ethylene group (—$CH_2CH_2$—) or a methyl methylene group (—CH($CH_3$)—).
* * * * *